Nov. 12, 1935.  O. J. SEGUIN  2,020,522
BOLT CAP
Filed July 11, 1934
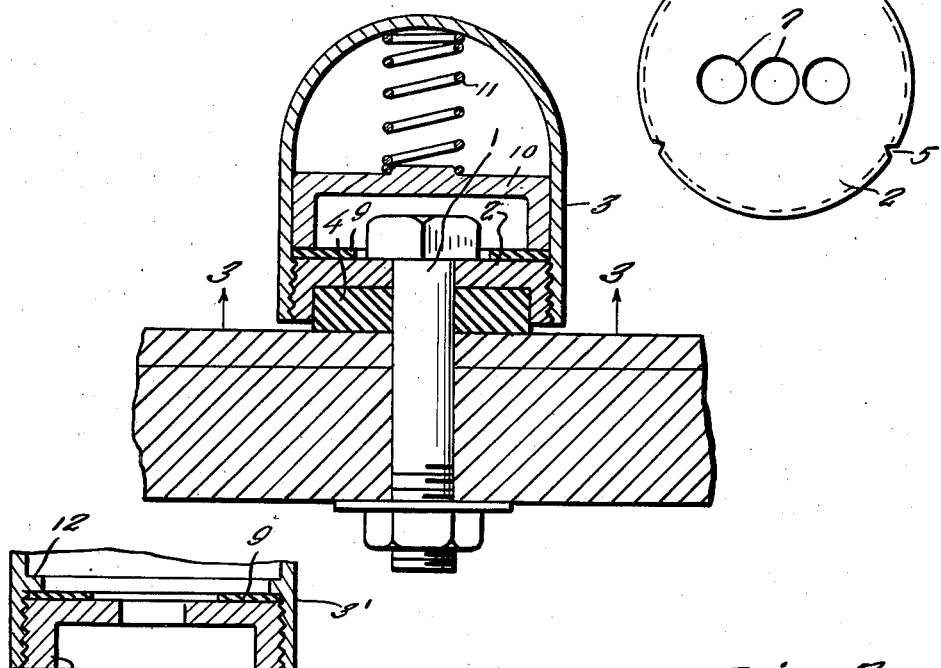
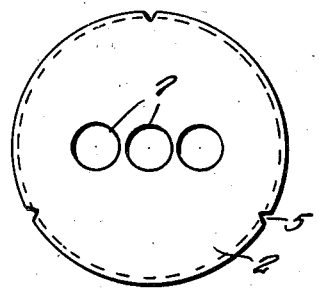
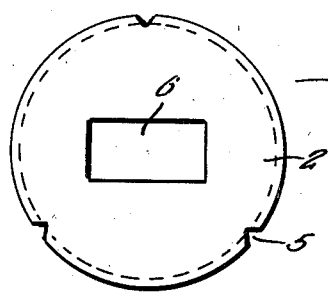
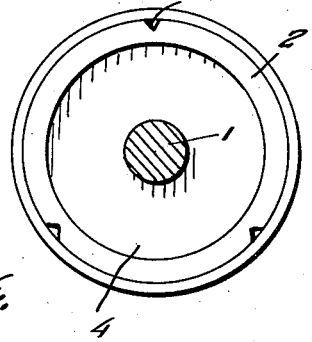
Inventor
O. J. Seguin
By Clarence A. O'Brien
Attorney Patented Nov. 12, 1935

2,020,522

UNITED STATES PATENT OFFICE 2,020,522

BOLT CAP

Oscar J. Seguin, Springfield, Mass.

Application July 11, 1934, Serial No. 734,682

3 Claims. (Cl. 85—53)

This invention relates to a bolt cap, the general object of the invention being to provide a cap for covering the head and washer of a bolt such as the bolts used for holding a closet bowl in place and also to provide means to prevent the parts from marring those parts of the bowl through which the bolts pass.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a vertical sectional view showing the invention in use.

Figure 2 is a view of a washer in section.

Figure 3 is a section on line 3—3 of Figure 1.

Figure 4 is a top plan view of the modified form of washer.

Figure 5 is a view of another form of washer.

Figure 6 is a sectional view showing a modification.

In this drawing, the numeral 1 indicates a bolt which may be one of the bolts used for connecting a flange of a bowl to the floor and the numeral 2 indicates a washer through which the bolt passes, said washer being exteriorly threaded to receive the internal threads of the lower end of the dome-shaped cap 3 so that when the cap is in place the washer and the head of the bolt are hidden from view. The washer is formed with a recess in its under face for receiving a resilient member 4 to prevent the washer and the cap from marring a part of the bowl or other device through which the bolt passes and this member 4 prevents moisture from reaching the bolt which would cause rust and thus render it difficult to remove the bolt after it has been in place for a long time. As shown in Figures 3 and 4, and 5, the periphery of the washer is provided with the spaced notches 5 which facilitate the removal of the cap after it has been in place for a long time as said notches provide interruptions of the threads in the washer so that the threaded part of the cap will not become firmly connected with the threaded part of the washer, which enables the cap to be removed by hand and the use of a wrench is not necessary. The washer is formed with either an elongated opening 6 for the passage of the bolt, as shown in Figure 4, or with a row of holes 7, as shown in Figure 5. The slot or the row of holes provides means for adjusting the washer and the cap on the bolt. For instance, if the bolt is near the bowl, the washer can be adjusted outwardly so that the bolt will be located in the inner end of the slot or opening 6, in Figure 4, or in the inner hole 7, in Figure 5. Thus the parts will be spaced from a side portion of the bowl. If the bolt is spaced quite a distance from the bowl then the washer is adjusted toward the bowl so that the cap is closer to the bowl than is the nut.

Instead of using the resilient member 4 as shown in Figure 1, I may groove the lower face of the washer 2', as shown in Figure 2, and use a ring-shaped gasket 8 which is of substantially semi-circular shape in cross section to fit in the groove. In order to prevent moisture from passing through the notches 5 and reaching the bolt, I provide a gasket 9 which rests on the washer and covers the notches and this gasket may be held in place by the cup-shaped member 10 shown in Figure 1 and pressed against the gasket by the spring 11 or the gasket may be held in place by an internal flange 12 of the cap 3' as shown in Figure 8.

As before stated, these notches will prevent the cap from becoming so fast to the washer that it can only be removed by a wrench which would mar the cap.

As will be seen, I have provided simple means for covering the washer and head of a bolt so as to give a job a finished appearance, with means for preventing moisture from reaching the bolt and marring of the member through which the upper part of the bolt passes.

It is thought from the foregoing description that the advantages and novel features of the invention will be readily apparent.

It is to be understood that changes may be made in the construction and in the combination and arrangement of the several parts provided that such changes fall within the scope of the appended claims.

What is claimed is:

1. In a device of the class described, a bolt, a washer through which the bolt passes, said washer having its periphery threaded and formed with vertical notches, said notches intersecting the threads and extending throughout the height of the washer, a cap threaded to the washer and covering the same and the head of the bolt, a gasket seated on the washer and covering the notches, and means for holding the gasket seated on the washer.

2. In a device of the class described, a bolt, a washer through which the bolt passes, said washer having its periphery threaded and formed with notches which intersect the threads and extend from one face of the washer to the other face, a cap threaded on the washer and covering the same and the head of the bolt, a gasket seated on the washer and covering the notches, a member located in the cap and engaging the gasket, spring means in the cap having one end engaging the end of the cap and the other the member for pressing said member against the gasket.

3. In a device of the class described, a bolt, a washer through which the bolt passes, said washer having its periphery threaded and formed with vertical notches, the notches extending from one face of the washer to the other face and intersecting the threads, a cap threaded to the washer and covering he same and the adjacent end of the bolt, a gasket seated on the washer and covering the notches, an internal flange on the cap and engaging the gasket for holding the same against the notched part of the washer.

OSCAR J. SEGUIN.